(12) United States Patent
Choi et al.

(10) Patent No.: US 7,396,043 B2
(45) Date of Patent: Jul. 8, 2008

(54) MULTIPLE CHAMBERED AIRBAG SYSTEM

(75) Inventors: Changsoo Choi, Rochester, MI (US); David W. Schneider, Waterford, MI (US)

(73) Assignee: Autoliv ASP, Inc., Ogden, UT (US)

(*) Notice: Subject to any disclaimer, the term of this patent is extended or adjusted under 35 U.S.C. 154(b) by 414 days.

(21) Appl. No.: 11/070,137

(22) Filed: Mar. 2, 2005

(65) Prior Publication Data
US 2006/0197318 A1     Sep. 7, 2006

(51) Int. Cl.
  *B60R 21/16*     (2006.01)
(52) U.S. Cl. .................................. 280/743.1
(58) Field of Classification Search ................ 280/729, 280/743.1, 732
  See application file for complete search history.

(56) References Cited
U.S. PATENT DOCUMENTS 3,843,150 A * 10/1974 Harada et al. ............... 280/729
5,599,041 A * 2/1997 Turnbull et al. ............. 280/729
5,927,748 A * 7/1999 O'Driscoll ................... 280/729
2003/0218325 A1 11/2003 Hasebe et al. ............. 280/743.2
2003/0230883 A1 12/2003 Heym ....................... 280/743.1

FOREIGN PATENT DOCUMENTS

GB          1 362 672        8/1974
JP          11321506 A   *  11/1999

* cited by examiner

*Primary Examiner*—Faye M. Fleming
(74) *Attorney, Agent, or Firm*—Sally J Brown; Stoel Rives, LLP

(57) ABSTRACT

Disclosed are methods and systems relating to automotive airbags. Embodiments of the disclosed invention include multiple inflatable chambers. The chambers may be configured to inflate sequentially such that one or more side chambers may inflate before a center chamber is inflated. Embodiments of the invention may employ separate inflators to inflate the side and center chambers such that the side chamber inflator is deployed prior to the center chamber inflator or, alternatively, a single inflator may be employed with vent openings between the side and center chambers to allow for fluid communication of the inflation gas therethrough.

21 Claims, 7 Drawing Sheets

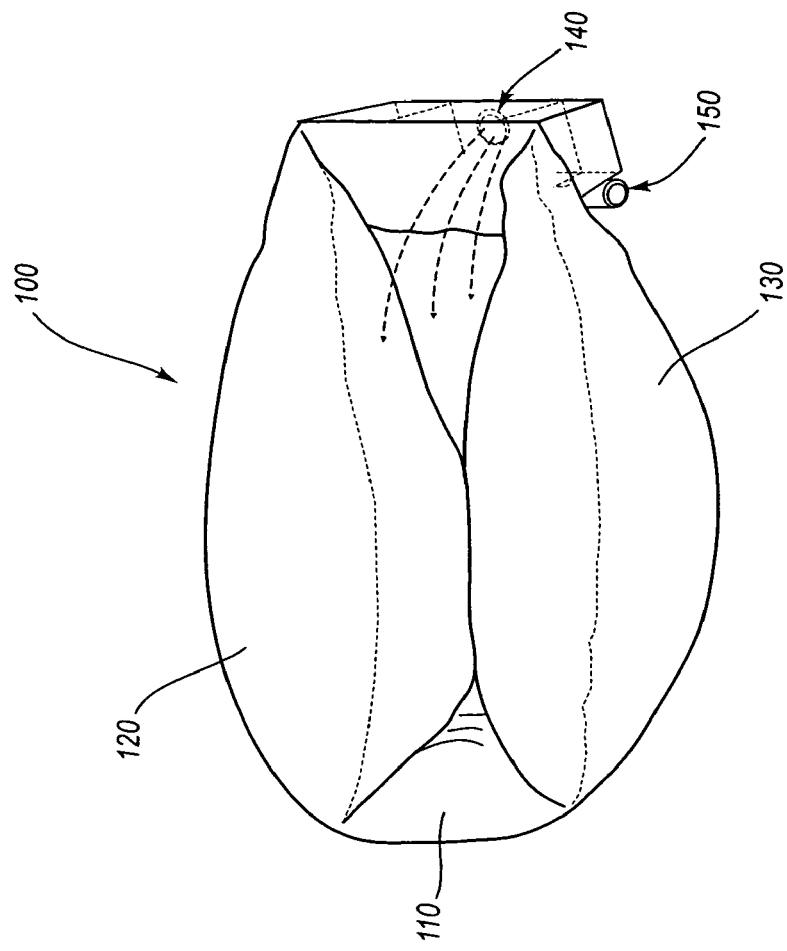
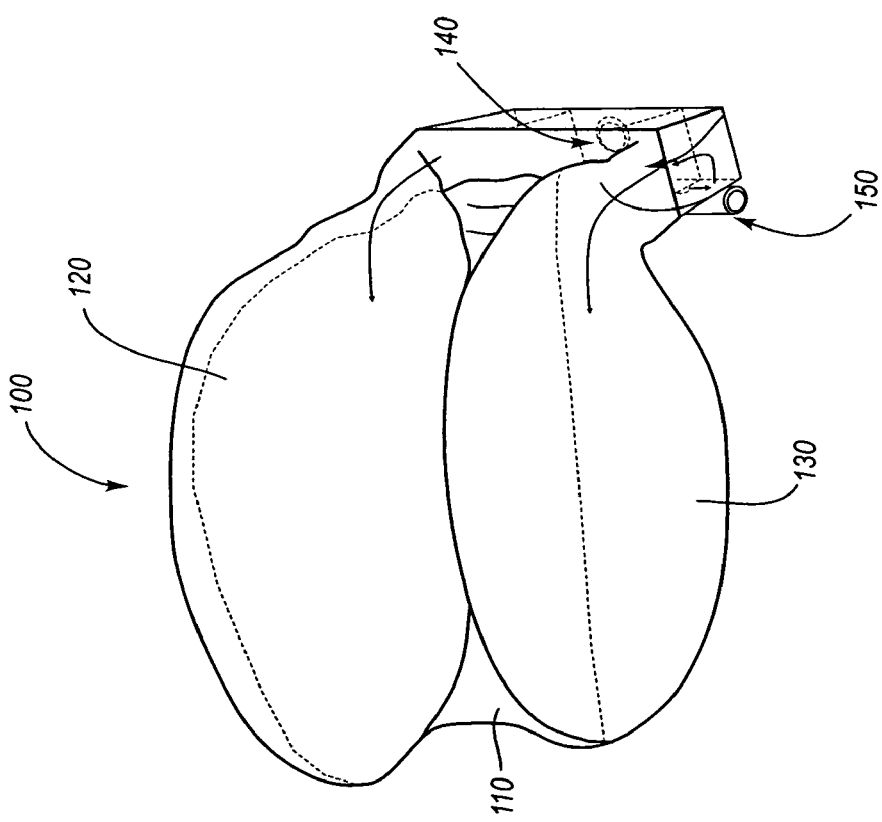
Fig. 2B
Fig. 2A

MULTIPLE CHAMBERED AIRBAG SYSTEM

TECHNICAL FIELD

The present invention relates generally to the field of automotive protective systems. More specifically, the present invention relates to inflatable airbags for automobiles.

BRIEF DESCRIPTION OF THE DRAWINGS

Understanding that drawings depict only typical embodiments of the invention and are not therefore to be considered to be limiting of its scope, the invention will be described and explained with additional specificity and detail through the use of the accompanying drawings in which:

FIG. 2A is a different perspective view of the embodiment shown in FIGS. 1A-1B during inflation of the side chambers.

FIG. 2B is a perspective view of the embodiment shown in FIG. 2A during inflation of the center chamber.

DETAILED DESCRIPTION OF PREFERRED EMBODIMENTS

Figure 1A:
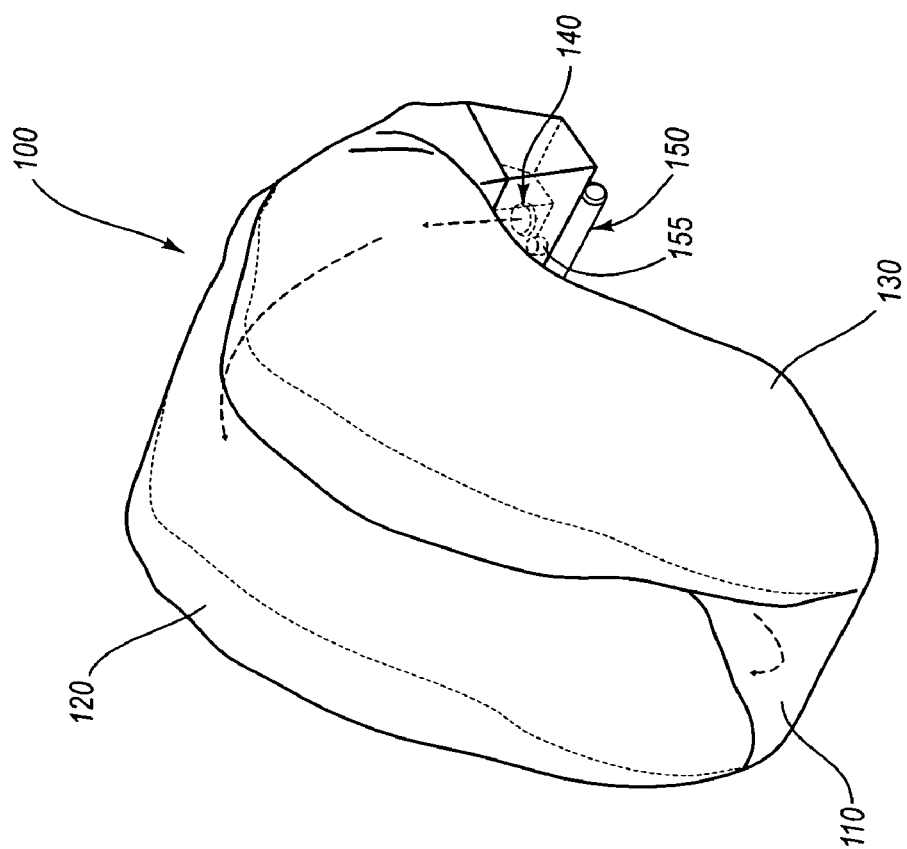
FIG. 1A is a perspective view of one embodiment of the invention during inflation of the side chambers.
Figure 1B:
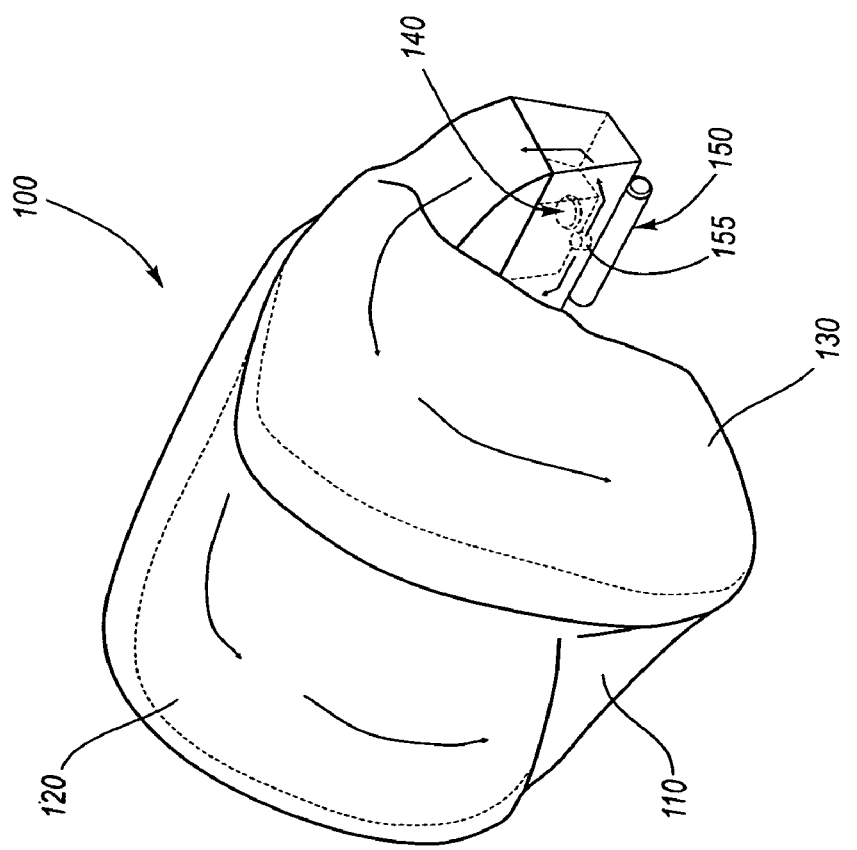
FIG. 1B is a perspective view of the embodiment shown in FIG. 1A during inflation of the center chamber.

Described below are embodiments of a multiple chambered airbag cushion and methods and systems related thereto. Although the disclosed embodiments should not be considered as limiting the scope of the claims, those embodiments have three chambers. The three chambers of the disclosed embodiments include a center chamber and two side chambers. The side chambers are positioned on opposite sides of the center chamber. One or more inflators may be used to inflate the airbag cushion. In embodiments employing only a single inflator, that inflator may be positioned to inflate each of the side chambers. The inflation gas may then travel from the side chambers to the center chamber via one or more openings between the side chambers and the center chamber. Alternative embodiments may employ multiple inflators. In one such embodiment, a first inflator is positioned to inflate the center chamber and a second inflator is positioned to inflate the side chambers. This embodiment is configured such that the second inflator inflates before the first inflator.

Each of the foregoing embodiments may therefore be configured such that the center chamber is inflated after a brief time delay following inflation of the two side chambers. The embodiment with a single inflator may achieve this outcome by virtue of directing inflation gas directly into the side chambers and allowing it to thereafter enter the center chamber via one or more openings allowing for fluid communication between the respective chambers. The embodiment with multiple inflators may achieve this objective by deploying the inflators sequentially such that there is a time delay in between deployment of the inflators.

The embodiments described generally above will now be described in more detail with reference to the accompanying drawings. With reference first to FIGS. 1A-1B and 2A-B, an airbag system 100 is depicted. Airbag system 100 includes three inflatable chambers. Inflatable chamber 110 is positioned adjacent to and in between inflatable chambers 120 and 130. Inflatable chambers 120 and 130 will be referred to as side chambers and inflatable chamber 110 will be referred to as a center chamber.

Side chambers 120 and 130 are shown as constructed by sewn panels. However, alternate embodiments may employ one piece woven constructions or any other constructions available to one of skill in the art. Some embodiments may also employ side chambers that are thinner than the center chamber, which may in certain circumstances facilitate desirable deployment characteristics. In some embodiments, providing thinner or flatter side chambers may be achieved by employing one piece woven constructions. While two separate side chambers are shown in the drawings, a single construction comprising two chambers in fluid communication with one another may alternatively be used. In such an alternative, the connected chambers may extend to opposing sides of the center chamber.

Airbag system 100 has two inflators. Inflator 140 is positioned to inflate chamber 110. Inflator 150 is positioned to inflate chambers 120 and 130. The airbag system 100 is configured such that inflator 150 inflates before inflator 140. The inflation port 155 of inflator 150 is positioned in between chamber 120 and chamber 130. As shown by the arrows in FIGS. 1A and 2A, inflation gas is directed from inflator 150 simultaneously into side chambers 120 and 130. After a brief time delay, inflator 140 is deployed. As shown by the arrows in FIGS. 1B and 2B, inflation gas is directed from inflator 140 directly into center chamber 110. In some embodiments, the time delay between deployment of inflator 150 and inflator 140 ranges between about 20 to about 60 milliseconds. In still other embodiment, the time delay ranges between about 1 to about 100 milliseconds. In one particular such embodiment, the time delay is about 40 milliseconds.

Figure 3B:
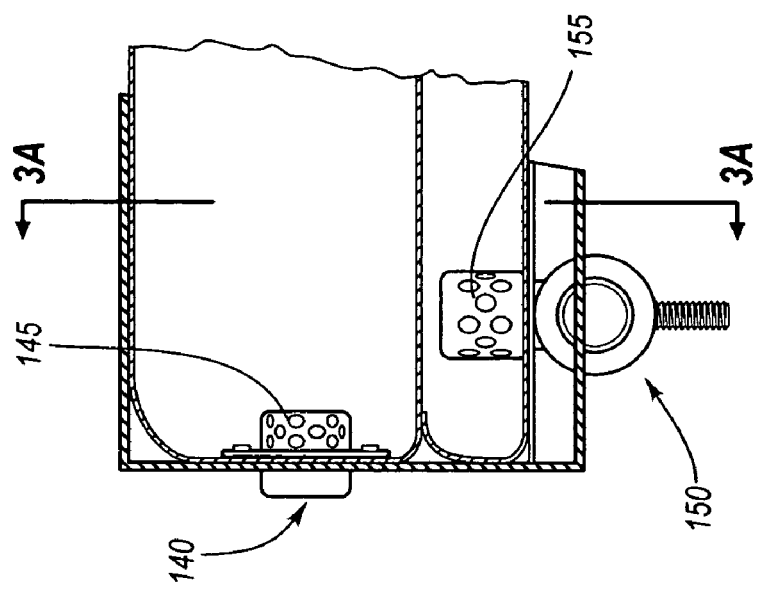
FIG. 3B is another cross-sectional view of one possible configuration for the inflators of the embodiment shown in FIG. 3A.
Figure 3A:
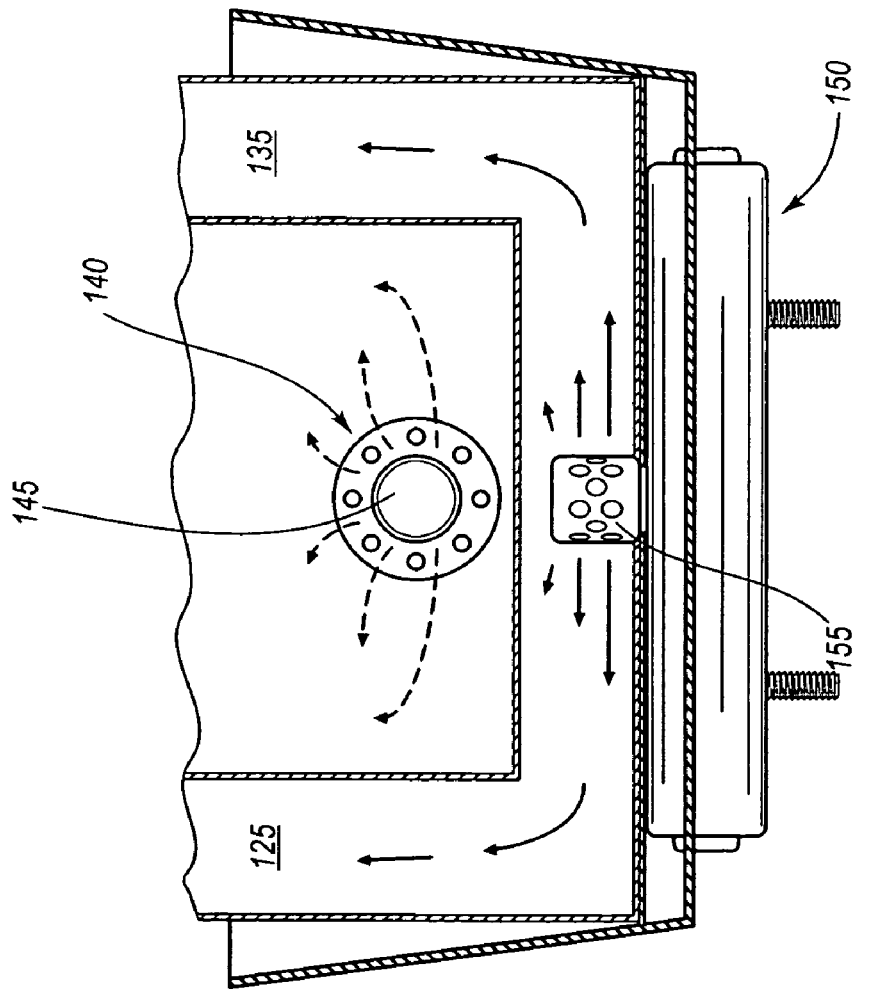
FIG. 3A is a cross-sectional view depicting one possible configuration for the inflators of an embodiment of the invention taken along line 3A-3A in FIG. 3B.

FIGS. 3A-3B depict in detail one possible embodiment of the configuration of inflators 140 and 150. As best seen in FIG. 3A, inflator 150 has a single inflation port 155. Inflation gas is directed from inflation port 155 in opposite directions towards inflatable chambers 120 and 130. From the perspective of FIG. 3A, inflation gas traveling to the left goes through chamber port 125, which leads to chamber 120. Likewise, inflation gas traveling to the right goes through chamber port 135, which leads to chamber 130.

Similarly, inflator 140 has a single inflation port 145, which directs inflation gas directly into center chamber 110. Of course, a variety of alternatives are available, as one of skill in the art would appreciate. For instance, inflator 150 could be configured with two inflation ports, one for each of the side inflatable chambers, such that the inflation gas may be projected more directly towards the respective side chambers. Alternatively, two or more separate inflators could be used and deployed substantially simultaneously to inflate the two side chambers. Also, as discussed in greater detail below, some embodiments may employ only a single inflator.

Figure 4B:
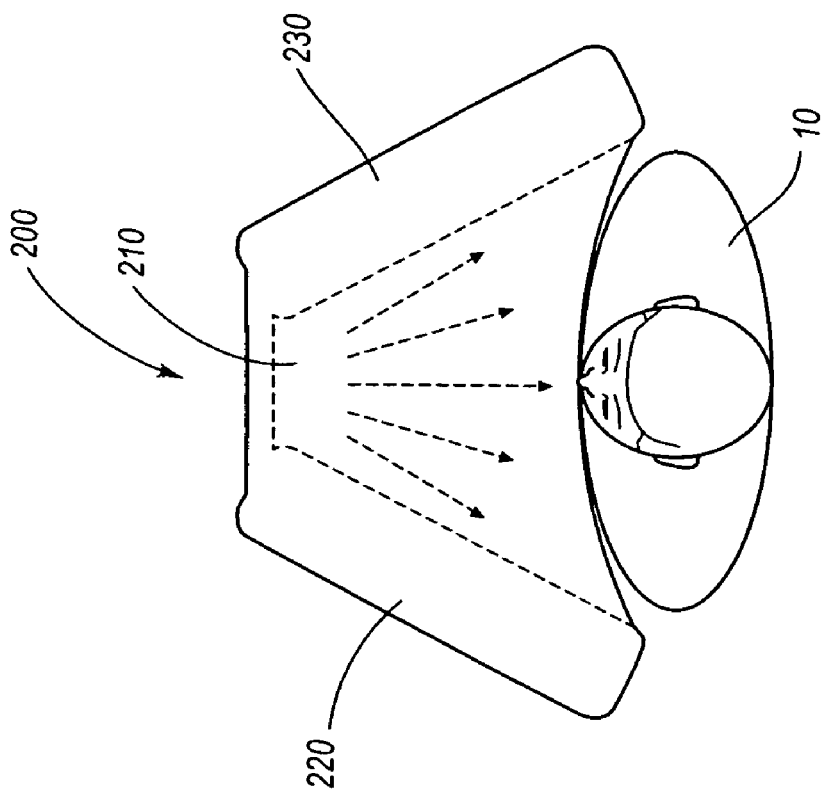
FIGS. 4A-4B are top views showing the sequential deployment of one embodiment of an airbag system adjacent to a vehicle occupant.
Figure 4A:
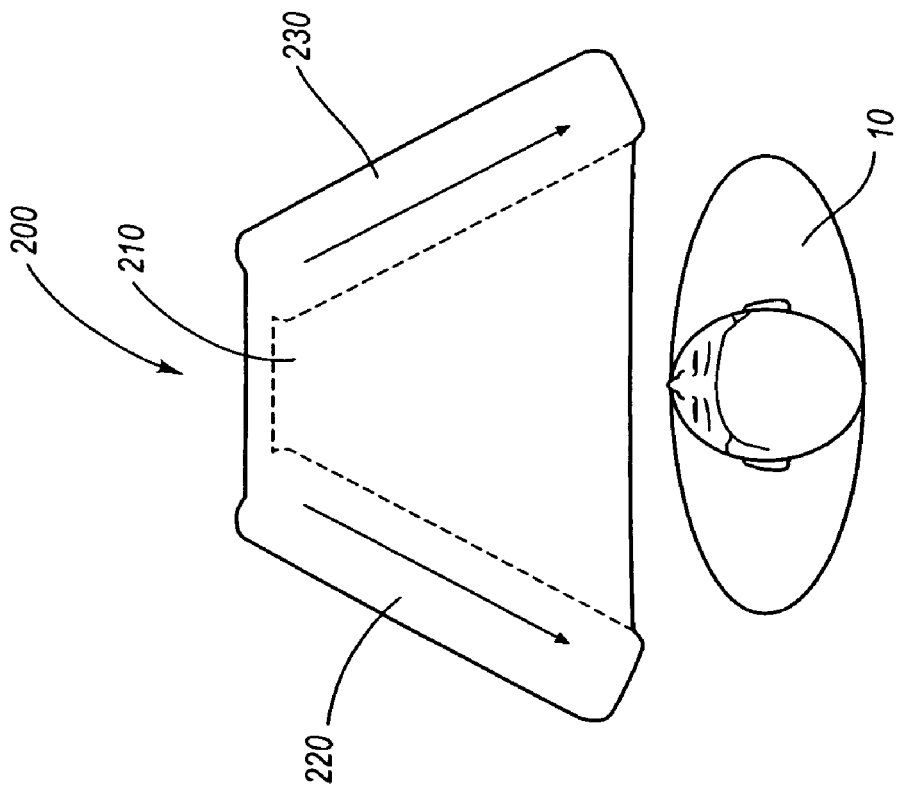

FIGS. 4A-4B sequentially depict the deployment of two inflators in an alternate airbag system 200 adjacent to an occupant 10. Airbag system 200 employs a center inflatable chamber 210 and two thin side inflatable chambers 220 and 230. As can be seen from the figures, chambers 220 and 230 are thinner than chamber 210. The arrows in FIG. 4A represent inflation gas entering side chambers 220 and 230 following deployment of one or more side chamber inflators. Following a brief time delay, the center chamber inflator is deployed. The arrows in FIG. 4B represent inflation gas entering center chamber 210 from the center chamber inflator.

Figure 6A:
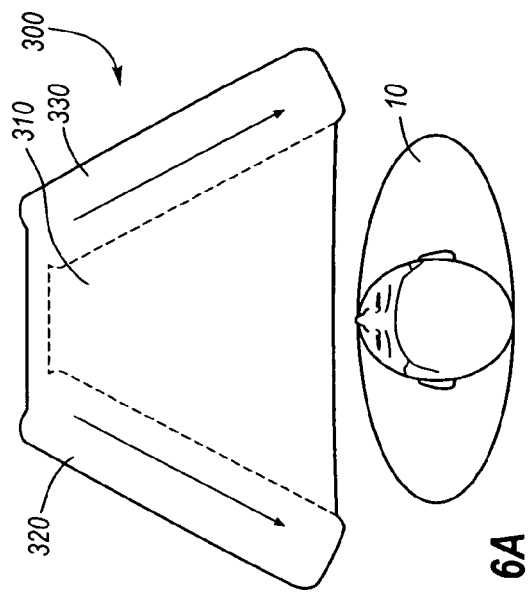
FIGS. 6A-6B are top views showing the sequential deployment of the airbag system embodiment shown in FIG. 5.
Figure 6B:
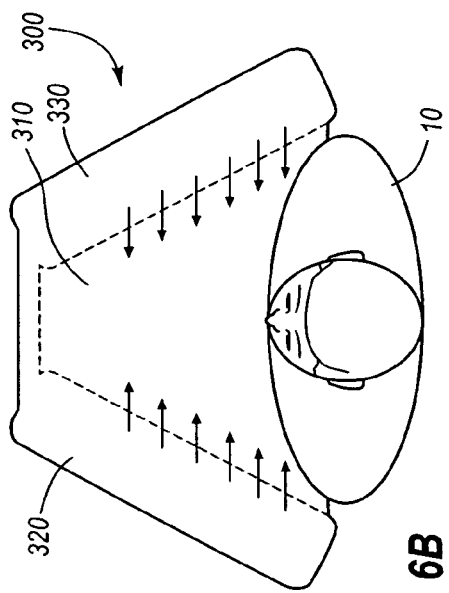
Figure 5:
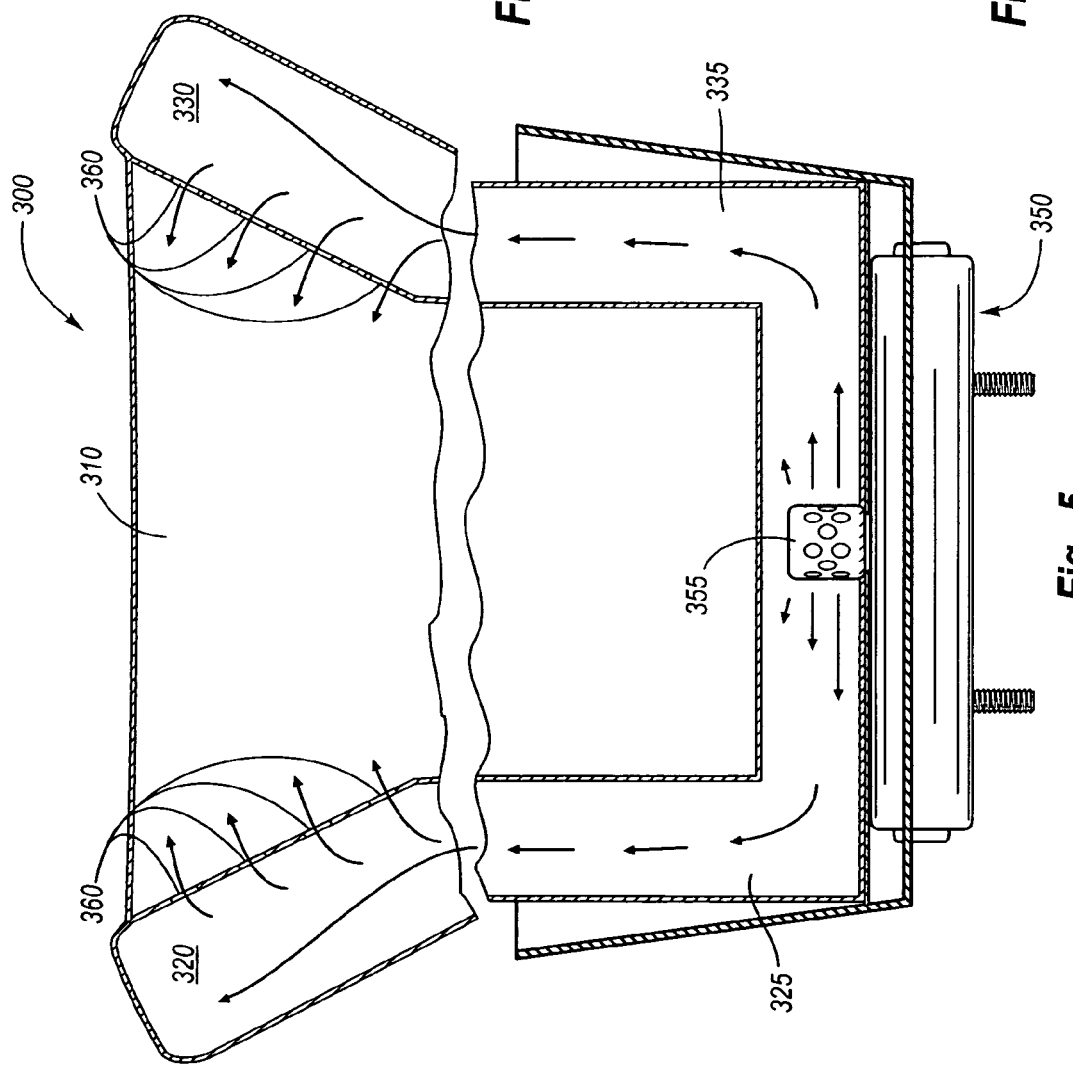
FIG. 5 is a cross-sectional view of another embodiment of an airbag system.

Another embodiment of the invention is depicted in FIGS. 5 and 6A-6B at 300. Airbag system 300 differs from airbag system 200 in that system 300 has only one inflator 350. As shown in FIG. 5, inflation gas is directed from inflator port 355 through chamber port 325 and into side chamber 320, while inflation gas is also directed through chamber port 335 and into side chamber 330. There is no separate inflator to fill center chamber 310. However, side chambers 320 and 330 both have a plurality of openings 360, through which inflation gas can travel from the side chambers to the center chamber. Arrows extend through openings 360 in FIG. 5 to represent inflation gas entering the center chamber 310 from side chambers 320 and 330.

FIGS. 6A-6B sequentially depict airbag system 300 being deployed adjacent to an occupant 10. In FIG. 6A, the arrows represent inflation gas entering the side chambers 320 and 330. Likewise, in FIG. 6B, the arrows represent inflation gas entering the center chamber 310 from the side chambers 320 and 330 via openings 360.

Figure 7B:
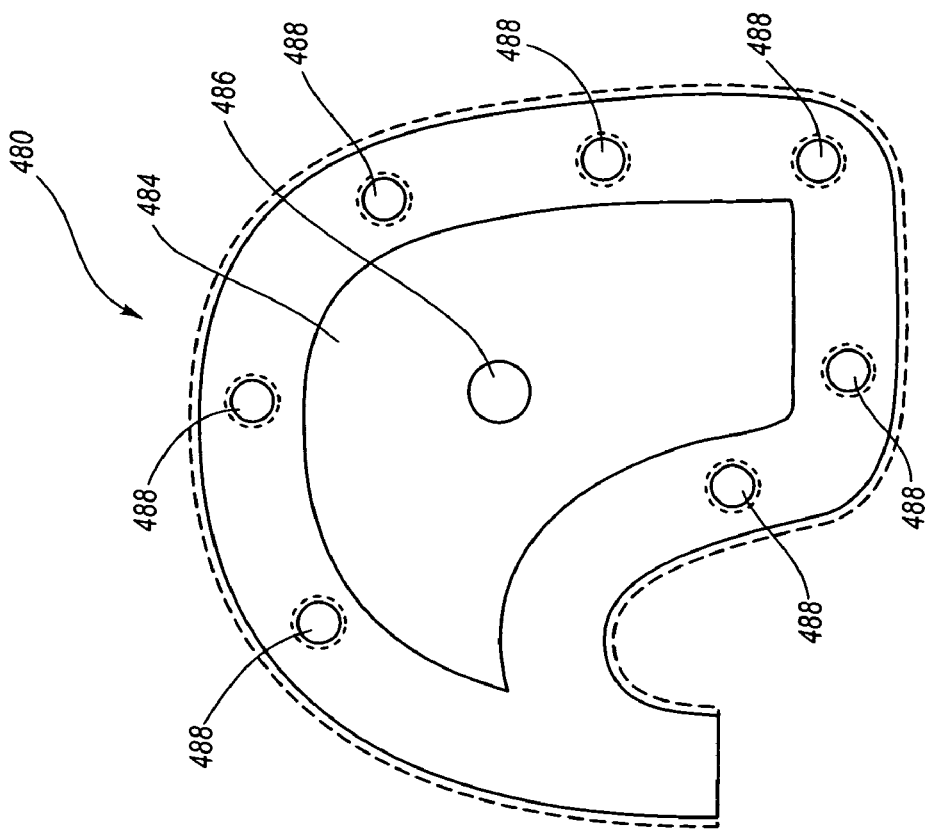
FIG. 7B is a side view of an interior side chamber panel.
Figure 7A:
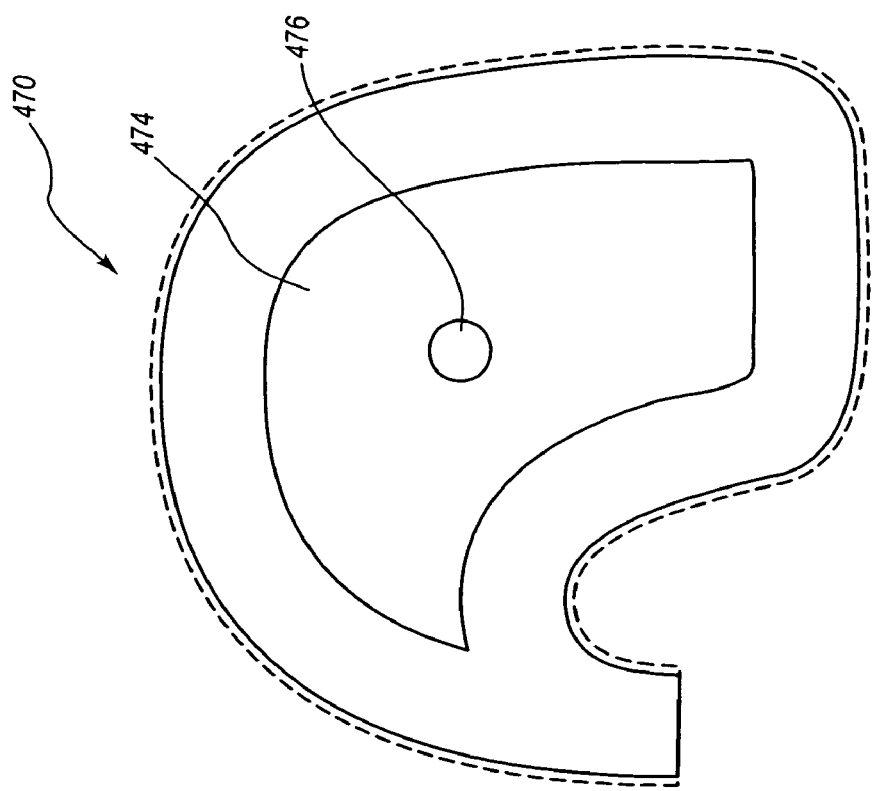
FIG. 7A is a side view of an exterior side chamber panel.

An alternative construction for the side chambers will now be discussed with reference to FIGS. 7A-7B. FIG. 7A depicts an exterior side chamber panel 470 and FIG. 7B depicts an interior side chamber panel 480. Panels 470 and 480 are sewn together at their respective perimeters in order to create a side inflatable chamber. Panels 470 and 480 are also attached to one another at attachment regions 474 and 484, respectively. Once panels 470 and 480 have been attached together to create an inflatable chamber, attached regions 474 and 484 create a non-inflatable portion in the chamber. Because the non-inflatable portion is at the center of the chamber, the attachment regions 474 and 484 in FIGS. 7A and 7B, respectively, allow for creation of an approximately donut-shaped non-inflatable portion.

One or more openings may optionally be formed in both panels to create a vent opening in one or more of the side inflatable chambers to allow for venting of inflation gas from the center chamber to the ambient environment. For example, FIGS. 7A-7B depict openings 476 and 486 in panels 470 and 480, respectively. Openings 476 and 486 coincide with one another once the panels have been attached together so that an opening is created through the entire chamber. This opening allows inflation gas to vent from the airbag from the center chamber following deployment.

One or more openings may also be formed in just the interior side chamber panel. Panel embodiments having these interior openings will typically be used in airbag systems having only a single inflator, for reasons that will become apparent. As shown in FIG. 7B, internal vent openings 488 are situated outside of and around the perimeter of attachment region 484. Openings 488 allow inflation gas to travel from a side chamber to a center chamber. Thus, the time delay between inflation of the center chamber and inflation of the side chambers may be achieved with one inflator positioned to inflate the side chambers and internal vent openings leading from the side chambers to the center chamber or, alternatively, by two inflators configured to deploy sequentially with a brief time delay between deployments.

Figure 8B:
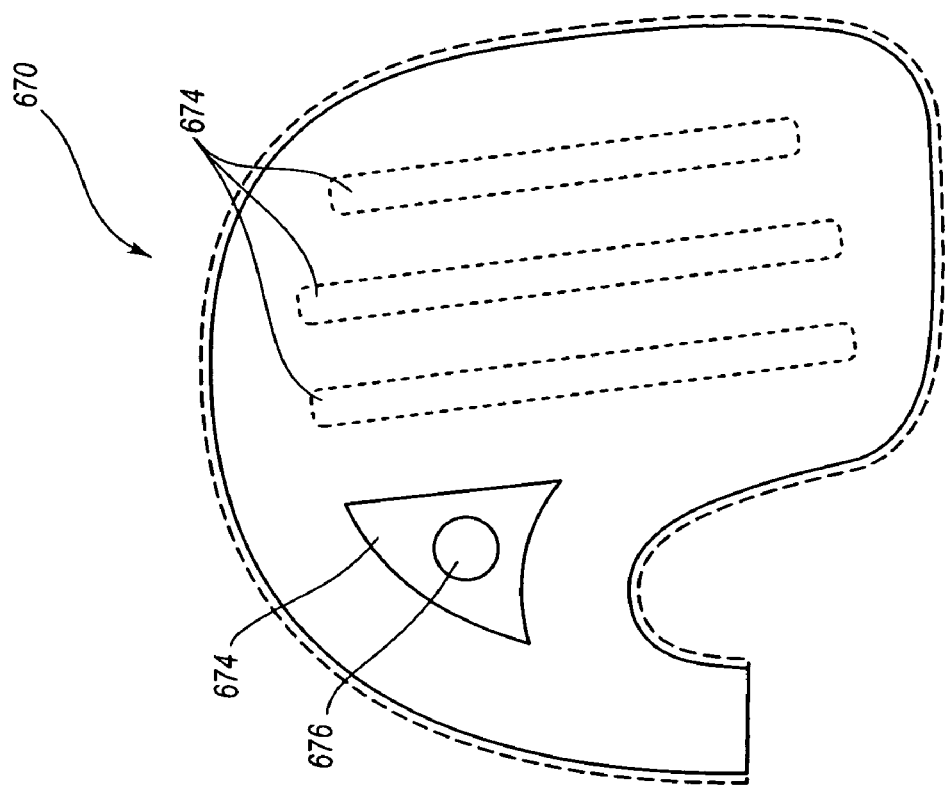
FIG. 8B is a side view of another alternative side chamber panel.
Figure 8A:
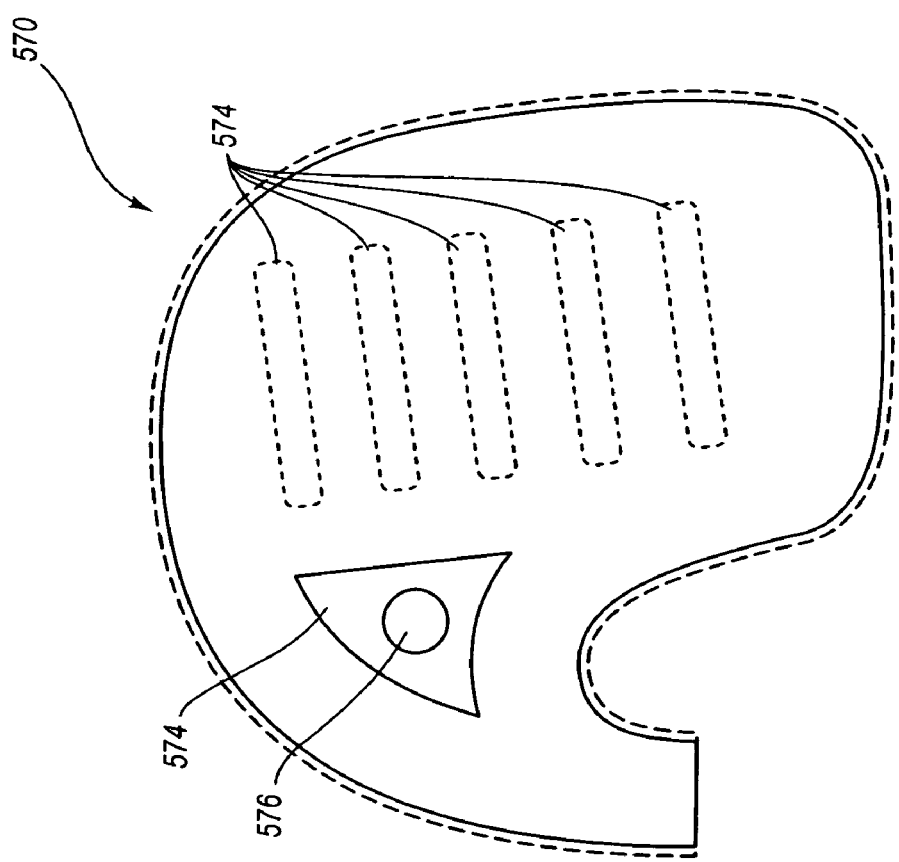
FIG. 8A is a side view of an alternative side chamber panel.

FIGS. 8A-8B show alternative embodiments of chamber panels facilitating different non-inflatable portions. These embodiments include straight, bar-like non-inflatable portions comprising sew patches that are approximately parallel to one another. The parallel non-inflatable portions 574 in FIG. 8A direct inflation gas towards the front of the bag (directly towards an occupant's upper body) upon inflation. The parallel non-inflatable portions 674 in FIG. 8B direct inflation gas downward and away from an occupant's upper body upon inflation. Panels 570 and 670 each include an additional non-inflatable portion in which external vent openings 576 and 676, respectively, are formed.

The above description fully discloses the invention including preferred embodiments thereof. Without further elaboration, it is believed that one skilled in the art can use the preceding description to utilize the invention to its fullest extent. Therefore the examples and embodiments disclosed herein are to be construed as merely illustrative and not a limitation of the scope of the present invention in any way.

It will be obvious to those having skill in the art that many changes may be made to the details of the above-described embodiments without departing from the underlying principles of the invention. The scope of the present invention should, therefore, be determined only by the following claims.

The invention claimed is:

1. An airbag system, comprising:
   a first inflatable chamber;
   a second inflatable chamber configured to inflate adjacent to the first chamber;
   a third inflatable chamber configured to inflate adjacent to the first chamber and opposite from the second chamber such that at least part of the first chamber is positioned in between the second and third chambers, wherein after inflation the second and third chambers are each thinner than the first chamber;
   a first inflator positioned to inflate the first chamber; and
   a second inflator positioned to inflate at least one of the second and third chambers, wherein the system is configured such that the second inflator inflates before the first inflator.

2. The airbag system of claim 1, wherein the second inflator inflates both the second and third chambers.

3. The airbag system of claim 1, wherein the second inflator inflates only the second chamber and further comprising a third inflator positioned to inflate the third chamber.

4. The airbag system of claim 3, wherein the system is configured such that the second and third inflators inflate substantially simultaneously.

5. The airbag system of claim 1, wherein the second and third chambers have one or more non-inflatable portions.

6. The airbag system of claim 5, wherein the second and third chambers each have a non-inflatable portion positioned such that the second and third chambers are approximately donut-shaped.

7. The airbag system of claim 5, wherein the second and third chambers each have a plurality of non-inflatable portions.

8. The airbag system of claim 7, wherein the plurality of non-inflatable portions comprise a plurality of sew patches.

9. The airbag system of claim 7, wherein the plurality of non-inflatable portions are approximately parallel to one another.

10. The airbag system of claim 9, wherein the plurality of non-inflatable portions direct inflation gas directly towards an occupant's upper body upon inflation.

11. The airbag system of claim 9, wherein the plurality of non-inflatable portions direct inflation gas away from an occupant's upper body upon inflation.

12. The airbag system of claim 1, wherein the second and third chambers each comprise one piece woven cushions.

13. An airbag system, comprising:
a first inflatable chamber;
a second inflatable chamber configured to inflate adjacent to the first chamber;
a third inflatable chamber configured to inflate adjacent to the first chamber and opposite from the second chamber such that at least part of the first chamber is positioned in between the second and third chambers, wherein the second and third chambers have one or more non-inflatable portions, and wherein the second and third chambers each have at least one opening to allow for fluid communication with the first chamber; and
an inflator positioned to inflate the second and third chambers, wherein the inflation gas travels through the openings and into the first chamber from the second and third chambers.

14. The airbag system of claim 13, wherein the second and third chambers each have a non-inflatable portion positioned such that the second and third chambers are approximately donut-shaped.

15. The airbag system of claim 14, wherein the second and third chambers each have a plurality of non-inflatable portions.

16. The airbag system of claim 15, wherein the plurality of non-inflatable portions comprise a plurality of sew patches.

17. The airbag system of claim 15, wherein the plurality of non-inflatable portions are approximately parallel to one another.

18. The airbag system of claim 17, wherein the plurality of non-inflatable portions direct inflation gas directly towards an occupant's upper body upon inflation.

19. The airbag system of claim 17, wherein the plurality of non-inflatable portions direct inflation gas away from an occupant's upper body upon inflation.

20. The airbag system of claim 13, wherein after inflation the second and third chambers are each thinner than the first chamber.

21. The airbag system of claim 13, wherein the second and third chambers each comprise one piece woven cushions.

* * * * *